United States Patent
Muire, III et al.

(10) Patent No.: US 8,163,454 B2
(45) Date of Patent: Apr. 24, 2012

(54) RESIN COMPOSITION FOR TONER, AND TONER USING THE RESIN COMPOSITION

(75) Inventors: Linwood Blanton Muire, III, Chiba (JP); Hiroyuki Takei, Kamagaya (JP); Yuji Emura, Columbia, TN (US); Kouichi Shiina, Ichihara (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 544 days.

(21) Appl. No.: 12/514,128

(22) PCT Filed: Oct. 29, 2007

(86) PCT No.: PCT/JP2007/001178
§ 371 (c)(1),
(2), (4) Date: May 8, 2009

(87) PCT Pub. No.: WO2008/065736
PCT Pub. Date: Jun. 5, 2008

(65) Prior Publication Data
US 2010/0003611 A1    Jan. 7, 2010

(30) Foreign Application Priority Data
Nov. 29, 2006 (JP) .................... 2006-322423

(51) Int. Cl.
*G03G 9/087* (2006.01)
*C08L 13/02* (2006.01)

(52) U.S. Cl. .............. 430/109.1; 430/109.3; 525/910; 525/941

(58) Field of Classification Search ............ 430/109.1, 430/109.3; 525/910, 941
See application file for complete search history.

(56) References Cited

U.S. PATENT DOCUMENTS
| | | | |
|---|---|---|---|
| 5,462,830 A | 10/1995 | Kubota et al. | |
| 2006/0003247 A1* | 1/2006 | Baker et al. | 430/109.3 |
| 2006/0181660 A1* | 8/2006 | Kawashima et al. | 349/106 |

FOREIGN PATENT DOCUMENTS
| | | |
|---|---|---|
| EP | 1 197 805 A2 | 4/2002 |
| EP | 1 564 600 A1 | 8/2005 |
| EP | 1 630 620 A1 | 3/2006 |
| JP | 63-220170 A | 9/1988 |
| JP | 6-258869 A | 9/1994 |
| JP | 7-064321 A | 3/1995 |
| JP | 9-015906 A | 1/1997 |
| JP | 2000-081730 A | 3/2000 |
| JP | 2001-092182 A | 4/2001 |
| JP | 2004-138672 A | 5/2004 |
| JP | 2006-038959 A | 2/2006 |

OTHER PUBLICATIONS
Extended Search Report from the European Patent Office issued in Applicant's corresponding European Patent Application No. 07827957.7 dated Aug. 5, 2010.
Form PCT/ISA/210 (International Search Report) dated Jan. 29, 2008.

* cited by examiner

*Primary Examiner* — Hoa V Le
(74) *Attorney, Agent, or Firm* — Buchanan Ingersoll & Rooney PC

(57) ABSTRACT

Disclosed is a resin composition for toners, which contains a resin (D) obtained by reacting a styrene polymer (A) containing an active hydrogen group and having a peak molecular weight (Mp) of not less than 30,000 but not more than 2,000,000, a styrene polymer (B) containing a carboxyl group and having a peak molecular weight (Mp) of not less than 2,000 but not more than 20,000, and a crosslinkable compound (C) having an isocyanate group.

11 Claims, No Drawings

RESIN COMPOSITION FOR TONER, AND TONER USING THE RESIN COMPOSITION

TECHNICAL FIELD

The present invention relates to a resin composition for toners used for electrophotography, electrostatic printing or the like, and a toner using the resin composition.

BACKGROUND ART

There has been generally used a heat roll fixing method for the electrophotography method in copiers and printers. Concretely, there is used a method which comprises forming an electrostatic latent image on the photo-sensitive material, then developing the latent image using a toner, transferring the toner image onto a fixing sheet such as paper or the like, and heat-pressing the transferred toner image using a heat roll. In this heat roll fixing method, in order to achieve enhanced economical efficiency in power consumption and increased photography speed, and to prevent papers from being curled, a toner superior in fixing properties is needed, which can be fixed at a lower temperature. In the conventional technique, there has been proposed a method to improve the molecular weight and molecular weight distribution of a binder resin. Concretely, it has been tested to have a binder resin of a low molecular weight and to lower the fixing temperature.

However, the melting point has been lowered owing to the lowered molecular weight whereas the cohesive force of a resin was also deteriorated simultaneously. Therefore, there was a problem such that an offset phenomenon occurred to the fixing roller. In order to prevent such a problem, there has been attempted a method to use a binder resin having a wide molecular weight distribution by mixing a high molecular weight resin and a low molecular weight resin, or, further to crosslink the high molecular weight portion of the binder resin or the like. However, in response to a demand for low temperature fixing properties in recent copiers, it is hard to mention that this is a technique capable of providing a toner having sufficient performance yet.

On the other hand, as copiers and printers have come to employ a higher speed, high performance requirements in electrified portions have also increased. That is, a higher durability is required for a toner and a longer-term stability in printing is needed.

Various resins for toners obtained by blending a linear polymer with a copolymer have been proposed as a binder resin requiring such performance conflicting with each other (for example, Patent Documents 1 and 2).

In Patent Document 1, there has been proposed a method for producing a resin for toners having a gel content by reacting a diisocyanate compound with a mixture of a copolymer comprising an acrylic or methacrylic ester monomer and a monomer having active hydrogen as a constituent unit, and a linear polymer, in order to prevent the offset phenomenon and exhibit a wide fixing temperature range. However, there were still problems in this method such that the gel fraction of the obtained resin was high and the fixing temperature became high.

Furthermore, in Patent Document 2, both low temperature fixing properties and hot offset resistance are achieved by having a molecular weight distribution of the binder resin and a molten viscosity at a high temperature and a low temperature of the binder resin within a specific range.

However, various methods have been attempted heretofore in order to provide a resin composition for toners having sufficient fixing properties and offset resistance, and excellent in the productivity; however, no perfect methods could be obtained heretofore to fully overcome the above defects.

Patent Document 1: Japanese Patent Laid-open No. 1988-220170
Patent Document 2: Japanese Patent Laid-open No. 2001-92182

DISCLOSURE OF THE INVENTION

The present invention is to solve the problems in the conventional toners, and to provide a resin composition for toners and a toner excellent in low temperature fixing properties, offset resistance and productivity.

In order to solve the above objects, the present inventors have conducted an extensive study and as a result, the present invention has been completed as described below.

That is, the present invention relates to a resin composition for toners comprising a resin (D) obtained by reacting a styrene polymer (A) containing an active hydrogen group and having a peak molecular weight (Mp) of not less than 30,000 but not more than 2,000,000, a styrene polymer (B) containing a carboxyl group and having a peak molecular weight (Mp) of not less than 2,000 but not more than 20,000, and a crosslinkable compound (C) having an isocyanate group.

Furthermore, the present invention relates to the resin composition for toners, wherein the ratio of the active hydrogen groups in the (A) and the isocyanate groups in the (C) is from 2:1 to 10:1.

Furthermore, the present invention relates to the resin composition for toners, wherein the active hydrogen group in the (A) is a hydroxyl group.

Furthermore, the present invention relates to the resin composition for toners, wherein the ½ flow temperature (Tm) measured with a flow tester is not less than 115° C. but not more than 135° C.

Furthermore, the present invention relates to the resin composition for toners, wherein the active hydrogen group in the (A) is not less than 0.01 mole but not more than 0.2 mole per 100 g of the (A).

Furthermore, the present invention relates to the resin composition for toners, wherein the glass transition temperature (Tg) of the (B) is not less than 40° C. but not more than 75° C.

Furthermore, the present invention relates to the resin composition for toners, wherein the gel fraction is not less than 0.1 weight % but not more than 3.0 weight %.

Furthermore, the present invention relates to the resin composition for toners, wherein the resin (D) is obtained by adding the (C) to a liquid containing a mixture of the (A) and the (B) for the reaction.

Furthermore, the present invention relates to the resin composition for toners, further comprising at least one of natural wax or polyolefin wax having a melting point of not less than 60° C. but not more than 145° C. and comprising the wax in an amount of not less than 0.1 weight % but not more than 10 weight % based on the resin (D).

Furthermore, the present invention relates to a toner comprising the resin composition for toners of the present invention and at least a colorant.

According to the present invention, there are provided a resin composition for toners excellent in low temperature fixing properties, offset resistance and productivity, and a toner using the resin composition.

BEST MODE FOR CARRYING OUT THE INVENTION

The resin composition for toners of the present invention will be described in more detail below. In the present invention, the term polymerization also includes the meaning of copolymerization in some cases, and the term polymer also includes the meaning of copolymer in some cases.

The resin (D) contained in the resin composition for toners of the present invention is obtained by reacting a styrene polymer (A) containing an active hydrogen group and having a peak molecular weight (Mp) of not less than 30,000 but not more than 2,000,000, a styrene polymer (B) containing a carboxyl group and having a peak molecular weight (Mp) of not less than 2,000 but not more than 20,000, and a crosslinkable compound (C) having an isocyanate group.

An object of the present invention is to provide a resin composition for toners excellent in low temperature fixing properties and offset resistance by combining a high molecular weight styrene polymer, a low molecular weight styrene polymer and a crosslinkable compound. Furthermore, the present invention is characterized in that the high molecular weight styrene polymer contains an active hydrogen group. The high molecular weight styrene polymer contains an active hydrogen group, whereby a resin composition for toners with enhanced productivity is provided. Furthermore, the low molecular weight styrene polymer contains a carboxyl group, whereby a resin composition for toners excellent in the reactivity is achieved. A carboxyl group is contained in the low molecular weight styrene polymer, whereby separation of the low molecular polymer and the high molecular polymer can be prevented and the reactivity with isocyanate can be enhanced.

In the present invention, the styrene polymer (A) containing an active hydrogen group and having a peak molecular weight (Mp) of not less than 30,000 but not more than 2,000,000 has a main constituent unit of a styrene monomer, and contains a constituent unit derived from a styrene polymer and a constituent unit derived from a compound having at least one active hydrogen group in a molecule. At this time, copolymerization may be carried out by using other polymerizable compounds as necessary.

The lower limit of the peak molecular weight (Mp) of the active hydrogen group-containing styrene polymer (A) is preferably not less than 30,000. Furthermore, the upper limit of Mp is preferably not more than 2,000,000 and further preferably not more than 1,000,000. When the peak molecular weight (Mp) is within the above range, the cohesive force of a resin composition for toners is enhanced and offset resistance thereof becomes excellent; therefore, it is preferable. When the aforementioned peak molecular weight (Mp) is smaller than the above range, the productivity is deteriorated because it takes time so as to increase the molecular weight, and sufficient offset resistance is not exhibited in some cases because the viscosity is insufficient in the case of using it as a toner. On the other hand, when it is higher than the above range, the styrene polymer (A) and the styrene polymer (B) are separated, and the viscosity is insufficient in the case of using it as a toner in some cases. The aforementioned peak molecular weight (Mp) is measured by the gel permeation chromatography (GPC) under conditions to be described below.

As the styrene monomer, the following compounds can be cited, though not restricted thereto. Examples thereof include styrene, α-methylstyrene, halogenated styrene, vinyl toluene, 4-sulfonamide styrene, 4-styrene sulfonate and the like.

Examples of the active hydrogen group in the active hydrogen group-containing styrene polymer (A) include a hydroxyl group, an amino group, a carboxyl group, a mercapto group and the like. Preferably used is a hydroxyl group. When the active hydrogen group is a hydroxyl group, the reaction rate of the resin becomes fast and further improvement of the productivity can be attempted.

As the compound containing a hydroxyl group used in the production of the active hydrogen group-containing styrene polymer (A), methacrylate containing a hydroxyl group can be preferably cited. Examples of the methacrylate containing a hydroxyl group include hydroxyethyl methacrylate, hydroxypropyl methacrylate, 2,3-dihydroxypropyl methacrylate, hydroxyethyl acrylate, hydroxypropyl acrylate and the like.

In the present invention, the styrene polymer (B) containing a carboxyl group and having a peak molecular weight (Mp) of not less than 2,000 but not more than 20,000 has a main constituent unit of a styrene monomer, and contains a constituent unit derived from a styrene monomer and a constituent unit derived from a compound having at least one carboxyl group in a molecule. At this time, copolymerization may be carried out by using other polymerizable compounds as necessary. The styrene polymer (B) as a low molecular weight polymer contains a carboxyl group, whereby the reaction rate can be accelerated and the productivity is thus improved.

As the constituent unit derived from a styrene monomer contained in the styrene polymer (B) containing a carboxyl group, there can be used the same compounds as the aforementioned styrene monomers used for the active hydrogen group-containing styrene polymer (A).

The lower limit of the peak molecular weight (Mp) of the styrene polymer (B) containing a carboxyl group is preferably not less than 2,000 and further preferably not less than 4,000. Furthermore, the upper limit of Mp is preferably not more than 20,000 and further preferably not more than 14,000. When the peak molecular weight (Mp) is within the above range, the fixing temperature can be lowered with reduced molten viscosity. However, when the peak molecular weight (Mp) is excessively low, the resin strength and cohesive force are reduced; therefore, it is not preferable from the viewpoints of durability and offset resistance. When the peak molecular weight (Mp) is excessively high, it is not preferable from the viewpoint of fixing properties in some cases.

As the monomer having at least one carboxyl group in a molecule used as a raw material of the styrene polymer (B) containing a carboxyl group, there can be exemplified, for example, unsaturated monocarboxylic acids such as acrylic acid, methacrylic acid and the like; unsaturated dicarboxylic acids such as maleic acid, fumaric acid, citraconic acid, itaconic acid and the like; and mono esters thereof.

Furthermore, other polymerizable compound used for the production of the aforementioned styrene polymer (A) or (B) refers to a compound having a polymerizable double bond in addition to styrene (styrene monomer), and the following exemplified compounds can be used. Examples thereof include acrylic esters such as methyl acrylate, ethyl acrylate, propyl acrylate, butyl acrylate, octyl acrylate, cyclohexyl acrylate, lauryl acrylate, stearyl acrylate, benzyl acrylate, furfuryl acrylate, tetrahydrofurfuryl acrylate, ethoxyl acrylate, butoxyl acrylate, glycidyl acrylate, β-methylglycidyl acrylate, 3,4-ethoxycyclohexylmethyl acrylate, dimethylaminomethyl acrylate ester, dimethylaminoethyl acrylate ester and the like; methacrylic esters such as methyl methacrylate, ethyl methacrylate, propyl methacrylate, butyl methacrylate, octyl methacrylate, lauryl methacrylate, stearyl methacrylate, cyclohexyl methacrylate, benzyl methacrylate, furfuryl methacrylate, tetrahydrofurfuryl methacrylate, glycidyl methacrylate, β-methylglycidyl methacrylate, 3,4-ethoxycyclohexylmethyl methacrylate, dimethylaminomethyl methacrylate ester, dimethylaminoethyl methacrylate ester and the like; aromatic vinyl compounds such as vinyl toluene, α-methylstyrene, chlorostyrene and the like; dialkyl esters of an unsaturated dibasic acid such as dibutyl maleate, dioctyl maleate, dibutyl fumarate, dioctyl fumarate and the like; vinyl esters such as vinyl acetate, vinyl propionate and the like; nitrogen-containing polymerizable compounds such as acrylonitrile, methacrylonitrile, acrylamide, methacrylamide, N-substituted acrylamide, N-substituted methacrylamide and the like; di-functional polymerizable compounds such as divinyl benzene, (poly)ethylene glycol diacrylate, (poly)ethylene glycol dimethacrylate and the like; and conjugated diene compounds such as butadiene, chloroprene, isoprene and the like. At least one or two or more kinds of these vinyl monomers may be used. Among these, particularly preferable examples of the polymerizable compound include aromatic vinyl compounds, acrylic esters, methacrylic esters, dialkyl fumarate esters, acrylonitrile, acrylamide, methacrylamide and the like.

The crosslinkable compound (C) having an isocyanate group refers to a compound having two or more isocyanate groups in a molecule, and may be obtained by reacting a plurality of isocyanate compounds. When the compound (C) is obtained by reacting a plurality of isocyanate compounds, its isocyanate compounds may be the same or different from each other. Examples of the crosslinkable compound (C) having an isocyanate group include aromatic diisocyanates and polyisocyanates such as diphenylmethane diisocyanate (MDI), polymethylene polyphenyl isocyanate (polymeric MDI), tolylene diisocyanate (TDI), naphthalene diisocyanate and the like; and in addition thereto, aliphatic isocyanates and polyisocyanates such as hexamethylene diisocyanate (HDI), tetramethylene diisocyanate, lysine methyl ester diisocyanate and the like; alicyclic isocyanates and polyisocyanates such as hydrogenated diphenylmethane diisocyanate, isophorone diisocyanate (IPDI), norbornene diisocyanate (NBDI), hydrogenated diphenylmethane diisocyanate, hydrogenated tolylene diisocyanate and the like; and aralkyl type diisocyanates such as xylylene diisocyanate (XDI) and the like. Preferably used are TDI and MDI.

Furthermore, modified polyisocyanates obtained by subjecting various polyisocyanates to various modifications such as biuret modification, allophanate modification, isocyanurate modification, urethane modification and the like can also be used. Among these, aromatic polyisocyanate is one of polyisocyanates which can be the most suitably used since it is highly reactive and cheap.

The resin composition for toners of the present invention is preferably obtained by reacting the active hydrogen group-containing styrene polymer (A) and the crosslinkable compound (C) having an isocyanate group at a ratio of the active hydrogen groups in the (A) and the isocyanate groups in the (C) of from 2:1 to 10:1. The ratio range is further preferably from 2:1 to 6:1. Within such a range, a resin composition for toners excellent in offset resistance and productivity can be obtained.

The number of active hydrogen groups in the styrene polymer (A) containing an active hydrogen group is preferably not less than 0.01 mole per 100 g of the (A). Furthermore, the number of active hydrogen groups is preferably not more than 0.2 mole and further preferably not more than 0.1 mole per 100 g of the (A).

When the number of active hydrogen groups is within the above range, the gel content in an appropriate amount is obtained so that a resin excellent in a balance between fixing properties and offset resistance can be obtained.

The amount of the styrene polymer (A) containing an active hydrogen group and having a peak molecular weight (Mp) of not less than 30,000 but not more than 2,000,000 is preferably not less than 5 weight % but not more than 50 weight %, based on the total weight of the (A) and (B). When the (A) is contained within this range, much excellent offset resistance is obtained. Furthermore, the amount of the styrene polymer (B) containing a carboxyl group and having a peak molecular weight (Mp) of not less than 2,000 but not more than 20,000 is preferably not less than 50 weight % but not more than 95 weight %, based on the total weight of the (A) and (B). When the (B) is contained within this range, the fixing properties and reactivity with isocyanate are much improved.

Furthermore, a high molecular weight styrene polymer and a low molecular weight styrene polymer are used together within the above range, but without deteriorating characteristics to each other, whereby a resin composition for toners excellent in a balance between offset resistance and fixing properties can be obtained.

Tg of the carboxyl group-containing styrene polymer (B) is preferably not less than 40° C. but not more than 75° C. By having Tg within this range, further favorable fixing properties and cold offset resistance are obtained. When Tg is excessively low, Tg of the binder resin for toners to be described later becomes lowered and storage stability of the obtained toner is deteriorated in some cases. Furthermore, when Tg is excessively high, Tg of the resin subjected to urethane extension becomes excessively high and fixing properties are deteriorated in some cases.

For the styrene polymer (A) and (B) in the present invention, two or more resins having different peak molecular weights (Mp), Tg, compositions and the like may be used together. At this time, even though the peak molecular weight (Mp), Tg, composition and the like of each resin are out of the above preferred range, such resins can be used as the preferable styrene polymer (A) and (B) when they are in the above range as a whole.

The ½ flow temperature (Tm) of the resin composition for toners of the present invention measured with a flow tester is preferably not less than 115° C. and further preferably not less than 120° C. Furthermore, Tm is preferably not more than 135° C. and further preferably not more than 130° C. By having Tm within this range, the viscosity excellent in a balance between fixing properties and offset resistance is obtained.

Meanwhile, for the resin composition for toners of the present invention, the gel fraction is preferably not less than 0.1 weight %, preferably not less than 3.0 weight % and further preferably not less than 1.5 weight %. By having the gel fraction within this range, favorable hot offset resistance can be obtained.

In the present invention, the active hydrogen group-containing styrene polymer (A) and the carboxyl group-containing styrene polymer (B) can be produced by a known method such as solution polymerization, bulk polymerization, suspension polymerization, emulsion polymerization or the like. Among these methods, solution polymerization using an organic solvent is suitably used from the viewpoint of its convenience. In the above solution polymerization, the kind of the solvent is not particularly limited, and aromatic hydrocarbons such as benzene, toluene, ethylbenzene, ortho-xylene, meta-xylene, para-xylene, cumene and the like are preferably used from the viewpoints of the solubility and economic efficiency of the raw material and the obtained resin. These solvents may be used singly or in combination, or other solvents can also be used.

The above reaction method is not restricted. For example, the resin composition for toners is obtained by adding the crosslinkable compound (C) having an isocyanate group to a liquid containing a mixture of the active hydrogen group-containing styrene polymer (A) and the carboxyl group-containing styrene polymer (B) for the reaction. At this time, the (C) is quickly dissolved in the liquid and the reaction rate of the hydroxyl group in the (A) and the isocyanate group in the (C) is accelerated so that the productivity is enhanced.

These materials may be reacted in a reactor or an extruder. Furthermore, in addition to the above method, the active hydrogen group-containing styrene polymer (A) and the crosslinkable compound (C) having an isocyanate group may be reacted and then reacted with the carboxyl group-containing styrene polymer (B). A polycondensation reaction for producing the carboxyl group-containing styrene polymer (B) may be carried out in the presence of polyisocyanate and/or the active hydrogen group-containing styrene polymer (A).

For example, as other method for reacting the active hydrogen group-containing styrene polymer (A), the carboxyl group-containing styrene polymer (B) and the crosslinkable compound (C) having an isocyanate group, there can be exemplified a method comprising feeding both resins of the active hydrogen group-containing styrene polymer (A) and the carboxyl group-containing styrene polymer (B) into a twin screw extruder for kneading, and further feeding the crosslinkable compound (C) having an isocyanate group to the resin mixture during kneading and conveying for further melt-kneading. Examples of the reactors in the above method include a single screw extruder, a static mixer and a usual reactor equipped with a stirrer.

The range of the above reaction temperature is preferably not less than 100° C. and further preferably not less than 140° C., and preferably not more than 200° C. and further preferably not more than 190° C. When the temperature is excessively low, urethane extending is insufficient and offset resistance is deteriorated in some cases. When the temperature is excessively high, the resin is decomposed by heat in some cases.

The amount of the crosslinkable compound (C) having an isocyanate group used is preferably from 0.05 to 10 weight % and further preferably from 0.1 to 5 weight %, based on the total 100 weight % of the active hydrogen group-containing styrene polymer (A) and the carboxyl group-containing styrene polymer (B). When the amount is smaller than the above range, it is not preferable from the viewpoint of offset resistance in some cases. When the amount is higher than the above range, the unreacted crosslinkable compound (C) remains in the obtained resin (D) in some cases.

In the above polymerization reaction, a polymerization initiator is preferably used. The polymerization initiators are not particularly limited, but radical polymerization initiators are usually used. Concrete examples thereof include azo type initiators such as 2,2'-azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), dimethyl-2,2'-azobisisobutyrate and the like; ketone peroxides such as methylethylketone peroxide, acetylacetone peroxide and the like; peroxy ketals such as 1,1'-bis(t-butylperoxy)-3,3,5-trimethylcyclohexane, 1,1-bis(butylperoxy)cyclohexane and the like; hydroperoxides such as t-butyl hydroperoxide, cumene hydroperoxide and the like; dialkyl peroxides such as di-t-butyl peroxide, t-butylcumyl peroxide, dicumyl peroxide and the like; diacyl peroxides such as isobutyryl peroxide, octanoyl peroxide, decanoyl peroxide and the like; peroxydicarbonates such as diisopropyl peroxydicarbonate, di-2-ethylhexyl peroxydicarbonate, di-n-propyl peroxydicarbonate and the like; sulfonyl peroxides such as acetylcyclohexyl sulfonyl peroxide and the like; and peroxyesters such as t-butyl peroxyacetate, t-butyl peroxyisobutyrate, t-butyl peroxyneodecanoate and the like. These compounds may be used singly or in combination of two or more kinds. The type and amount of the polymerization initiator can be suitably selected depending on the reaction temperature, concentration of the monomer and the like. The amount thereof is usually from 0.01 to 10 weight parts per 100 weight parts of the monomer to be introduced. Furthermore, by properly selecting the reaction temperature and the like, polymerization can be carried out without employing a polymerization initiator.

The resin composition for toners of the present invention may further contain at least one of natural wax or polyolefin wax such as polyethylene wax, polypropylene wax or the like. The amount thereof is preferably not less than 0 weight %, more preferably not less than 0.1 weight % and preferably not less than 10 weight %, based on the aforementioned resin (D).

For the polyolefin wax used in the present invention, the melting point is preferably not less than 60° C. but not more than 145° C.

Specific commercial products corresponding to the above polyolefin wax include, but not limited to, Hi-wax 800P, 400P, 200P, 100P, 720P, 420P, 320P, 405 MP, 320 MP, 4051E, 2203A, 1140H, NL800, NP055, NP105, NP505, NP805 and the like produced by Mitsui Chemicals, Inc.

Examples of the natural wax used in the present invention include ceramic wax, rice wax, sugar wax, sumac wax, beeswax, carnauba wax, candelila wax, montan wax and the like.

The toner of the present invention will be described in detail below.

The toner of the present invention contains at least the aforementioned resin composition for toners of the present invention and a colorant. Furthermore, the toner of the present invention may contain a charge controlling agent (CCA), a surface-treating agent or the like. The amount of the resin composition for toners of the present invention is preferably from 50 weight % to 95 weight % in the toner.

Conventionally known dyes and pigments can be used for colorants. Specifically, the colorants include, for example, carbon black, magnetite, Phthalocyanine Blue, Peacock blue, Permanent red, lake red, Rhodamine lake, Hansa Yellow, Permanent yellow, benzidine yellow, nigrosine dyes (C. I. No. 50415), aniline blue (C. I. No. 50405), charcoal blue (C. I. No. azoec Blue 3), chrome yellow (C. I. No. 14090), ultra marine blue (C. I. No. 77103), Dupont oil red (C. I. No. 26105), Orient oil red #330 (C. I. No. 60505), Quinoline Yellow (C. I. No. 47005), methylene blue chloride (C. I. No. 52015), Phthalocyanine Blue (C. I. No. 74160), Malachite Green oxalate (C. I. No. 42000), lamp black (C. I. No. 77266), rose Bengal (C. I. No. 45435), oil black, azo oil black and the like. The amount to be used is preferably from 3 weight parts to 15 weight parts, based on 100 weight parts of the resin composition for toners.

Furthermore, any of known charge controlling agents of nigrosine, quaternary ammonium salt or metal containing azo dyes can be properly selected and used as a charge controlling agent. The amount to be used is usually from 0.1 weight parts to 10 weight parts, based on 100 weight parts of the resin composition for toners.

A surface-treating agent added in the toner is present between the toner and a carrier or in the toner. Accordingly, the powder fluidity and life of developing agent can be improved. As specific examples of the surface-treating agent, there can be mentioned, for example, fine powders of colloidal silica, alumina, titanium oxide, polytetrachloroethylene, polyvinylidene chloride, polymethyl methacrylate, polystyrene ultrafine particles and silicone. As commercial products, there are mentioned, for example, AEROSIL 130, 200, 200V, 200CF, 200FAD, 300, 300CF, 380, R972, R972V, R972CF, R974, R976, RX200, R200, R202, R805, R812, R812S, TT600, MOX80, MOX170, COK84, titanium oxide T805 and titanium oxide P25 (these are products of Nippon Aerosil Co., Ltd. and Degussa Japan Co., Ltd.); and CAB-O-SIL L90, LM130, LM150, M5, PTG, MS55, H5, HS5, LM150D, M7D, MS75D, TS720, TS610 and TS530 (these are products of CABOT Corp.). The specific surface area of the surface-treating agent is preferably not less than 30 m$^2$/g, particularly in the range of 50 to 400 m$^2$/g as measured by nitrogen adsorption using the BET method. The amount of the surface-treating agent used is preferably 0.1 weight % to 20 weight %, based on the weight of the resin composition for toners.

The toner in the present invention may contain a wax such as polyolefin wax, natural wax or the like and the amount of the wax used is preferably from 0 weight parts to 10 weight parts, based on 100 weight parts of the resin composition for toners.

In order to produce the toner of the present invention containing these materials, for example, the resin composition for toners of the present invention, a colorant and, as necessary, other additives are sufficiently mixed using a powder mixer. Thereafter, the resulting mixture is then melt-kneaded using a heat roll, a kneader or an extruder to sufficiently mix the individual components. The melt-kneaded material is cooled, ground, and sieved to collect particles having particle diameters of ordinarily 5 to 20 micro-meters. The collected particles are coated with a surface-treating agent according to a powder mixing method to obtain a toner.

The resulting toner according to the present invention can employ various development methods, for example, a cascade development method, a magnetic flash development method, a powder cloud development method, a touch-down development method, a so-called micro-toning development method using, as a carrier, a magnetic toner produced by grinding, and a so-called bipolar magnetic toner development method in which a required amount of toner charges are obtained by the friction between magnetic toner particles. The development methods are not restricted thereto.

The toner obtained by the present invention can be applied to various fixing methods in addition to an oil-free fixing method. Specifically, there can be used an oil-coated heat roll fixing method, a flash fixing method, an oven fixing method, a pressure fixing method or the like.

The toner obtained by the present invention can be applied to various cleaning methods, for example, a so-called fur brush method, a blade method and the like.

EXAMPLES

The present invention is described specifically below by way of Examples. However, the present invention is not restricted to these Examples.

In Examples, the molecular weight and molecular weight distribution were measured by GPC. The measurement was conducted in terms of the following conditions, based on the commercial monodispersed standard polystyrene.

Detector: SHODEX RI-71S type refractive index measurement device (a product of Showa Denko K.K.)
Solvent: Tetrahydrofuran
Column: A piece of KF-G, three pieces of KF-807L and a piece of KF800D were connected serial (all columns were manufactured by Showa Denko K.K.)
Flow rate: 1.0 ml/min
Sample: 0.25 weight % THF solution The reliability of the measurement under the above conditions can be confirmed if Mw/Mn of NBS706 polystyrene sample (Mw=288,000, Mn=137,000, Mw/Mn=2.11) is 2.11±0.10.

The glass transition temperature (Tg) of the present Examples was measured using Q1000 (a product of TA Instruments Ltd.) according to the differential scanning calorimetry (DSC). About 10 mg of a sample was subjected to temperature elevation from −20° C. to 100° C. at a rate of 10° C./min to obtain a curve; in the curve, an intersection between the base line and the inclined line of the endothermic peak was determined to obtain Tg. It is desired that, before the above temperature elevation measurement, the sample resin is heated to about 200° C., is kept at that temperature for 5 minutes, and is cooled quickly to normal temperature (25° C.), in order to allow the sample resin to unify a thermal history.

The ½ flow temperature (Tm) measured with a flow tester in the present Examples refers to a temperature corresponding to ½ of the height from the initiation point of flowing out to completion point of flowing out when a toner sample of 1 cm$^3$ was melted and flowed out under conditions of a diameter of a pore of a die of 1 mmΦ*1 mm, a pressure of 20 Kg/cm$^2$ and a temperature elevation speed of 6° C./min. using an elevated flow tester CFT-500 manufactured by Shimadzu Corporation.

The evaluation methods of the toner carried out in the following Examples are described below.

1. Productivity 60 g of both the resin (A) and the resin (B) was fed into a batch kneader (Labo Plastomill, a product of Toyo Seiki Seisaku-sho, Ltd.) and kneaded at 175° C. at a rotation speed of 150. Further, the crosslinkable agent (C) was injected therein for measuring a torque of the kneader. The time taken until the torque was balanced after the crosslinkable agent was injected was taken as the reaction rate.

Based on the above reaction rate, the productivity was evaluated in the following manner.
⊚: Reaction rate≦90 sec
◯: 90 sec<Reaction rate≦240 sec
Δ: 240 sec<Reaction rate≦300 sec
X: 300 sec<Reaction rate 2. Fixing Properties An unfixed image was formed using a copier produced by remodeling of a commercial electrophotographic copier. Thereafter, the unfixed image was fixed using a heat roller fixing apparatus produced by remodeling of the fixing section of a commercial copier. The fixing of a toner was conducted at a fixing rate of the heat roll of 200 mm/sec with the temperature of the heat roller being changed at intervals of 5° C. The fixed image obtained was rubbed 10 times by applying a load of 0.5 kgf using a sand eraser (a product of Tombow Pencil Co., Ltd.), and the image densities before and after the rubbing test were measured using a Macbeth reflection densitometer. The lowest fixing temperature, at which the change ratio of image density at each temperature became not less than 60%, was taken as the lowest fixing temperature of the toner. On the basis of this lowest fixing temperature, fixing properties were evaluated in the following manner. The heat roller fixing apparatus used had no silicone oil feeder. The environmental conditions were normal temperature and normal pressure (temperature of 22° C. and relative humidity of 55%).
◯: Lowest fixing temperature≦135° C.
Δ: 135° C.<Lowest fixing temperature≦150° C.
X: 150° C.<Lowest fixing temperature 3. Offset resistance The offset resistance was evaluated in accordance with the above measurement of the lowest fixing temperature. After an unfixed image was formed using the above copier, the toner image was transferred and fixed using the above heat roller fixing apparatus. Then, a white transfer paper was fed into the heat roller fixing apparatus under the same conditions, and the appearance of toner staining on the transfer paper was examined visually. This operation was repeated by gradually increasing the set temperature of the heat roller of the heat roller fixing apparatus. The lowest set temperature at which toner staining appeared on the transfer paper was taken as the temperature of offset appearance. Based on this temperature of offset appearance, offset resistance was evaluated in the following manner. The environmental conditions were normal temperature and normal pressure (temperature of 22° C. and relative humidity of 55%).

(Cold Offset Evaluation)

○: Temperature of cold offset appearance≦135° C.

Δ: 135° C.<Temperature of cold offset appearance≦149° C.

X: 149° C.<Temperature of cold offset appearance, or offset appearance at all temperatures (Hot Offset Evaluation)

○: Temperature of hot offset appearance≦220° C./190 mm/s or no offset appearance Δ: 220° C.<Temperature of hot offset appearance≦161, all speeds X: 161° C.<Temperature of hot offset appearance, or offset appearance at all temperatures 4. Gel Fraction The content of the gel component in the Examples was defined on the basis of the value measured in the following manner. 2.5 g of a resin and 47.5 g of ethyl acetate were poured into a 100-ml sample tube. This sample tube was stirred at a rotation speed of 50 rpm, a temperature of 22° C. for 12 hours, and then allowed to stand at 22° C. for 12 hours. After that, 5 g of the supernatant liquid in the sample tube was dried at 150° C. for 1 hour to measure the weight (Xg) and the content was calculated by the following equation.

Gel fraction(%)=((2.5/50−$X$/5)/(2.5/50))×100

A method for producing a sample fed for evaluation will be described hereinafter. Incidentally, any of the commercial waxes was used as the wax. Also, "parts" hereinafter indicates weight parts unless otherwise mentioned specifically.

Production Example 1

73 parts of styrene, 24.5 parts of n-butyl acrylate and 2.5 parts of hydroxyethyl methacrylate were fed into a flask purged with nitrogen, and heated to an internal temperature of 120° C. and then kept at the same temperature for carrying out the bulk polymerization for 10 hours. The rate of polymerization at this time was 51%. Subsequently, 30 parts of xylene was added thereto, 0.1 part of dibutyl peroxide and 50 parts of xylene which were previously mixed and dissolved were continuously added over 8 hours while maintaining the temperature at 130° C. Further, 0.2 parts of 1,1'-bis(t-butylperoxy)-3,3,5-trimethylcyclohexane was added and continuously reacted for 2 hours. Thereafter, 0.5 parts of 1,1-bis(t-butylperoxy)-3,3,5-trimethylcyclohexane was further added and kept for 2 hours to obtain a styrene polymer A1 having a peak molecular weight (Mp) of 200,000 as a high molecular weight polymer (A).

Furthermore, with the compositions to be fed as shown in Table 1, styrene polymers A2 to A5 were obtained in the same manner as in Production Example 1 as a high molecular weight polymer.

Production Example 2

3 parts of di-t-butyl peroxide per 100 parts of styrene was uniformly dissolved in a solution containing 92.5 parts of styrene, 6.5 parts of n-butyl acrylate, 1.0 part of methacrylic acid and 75 parts of a xylene solvent. This solution was continuously fed into a 5-L reactor kept at an internal temperature of 190° C., an internal pressure of 6 kg/cm$^2$ at a rate of 750 ml/hour to obtain a styrene polymer B1 having a peak molecular weight (Mp) of 5,000 as a low molecular weight polymer.

Furthermore, with the compositions to be fed as shown in Table 2, styrene polymers B2 to B7 having a peak molecular weight (Mp) of 5,000 to 21,000 were obtained in the same manner as in Production Example 2 as a low molecular weight polymer.

Example 1

30 parts of the styrene polymer A1 and 70 parts of the styrene polymer B1 were mixed using a Henschel mixer and then the resulting material was kneaded using a twin screw extruder (KEXN S-40 type, a product of Kurimoto Ltd.) Tolylene diisocyanate (TDI) was fed into the extruder and reacted with the polymer mixture. The temperature was set so that the reactant temperature at the extruder exit was 175° C. Then, the reactant was cooled and ground to obtain a resin 1. Physical properties of the resin are shown in Table 3.

Examples 2 to 7

Resins 2 to 7 were obtained in the same manner as in Example 1 using the components illustrated in Tables 1 and 2. Physical properties of these resins are shown in Table 3.

Comparative Examples 1 to 3

Resins 8 to 10 were obtained in the same manner as in Example 1 using the components illustrated in Tables 1 and 2. Physical properties of these resins are shown in Table 3.

Example 8

1.0 part of carbon black (REGAL 330R, a product of CABOT Corp.), 1.0 part of a charge controlling agent (T-77, a product of Hodogaya Chemical Co., Ltd.) and 2.5 parts of polypropylene wax (Hi-wax NP105, a product of Mitsui Chemicals, Inc.) were premixed to the resin obtained according to Example 1 using a Henschel mixer. Thereafter, the resulting material was set to 120° C. and kneaded using a twin screw extruder (PCM30, a product of Ikegai Corporation) and then after cooling was coarsely ground using a hammer mill. Then, the coarsely ground resin was finely ground using a jet grinder (IDS2 type, a product of Nippon Pneumatic Co., Ltd.), followed by air classification, to obtain a toner particle having an average particle diameter of 8.5 μm (not more than 5 μm: 3 weight %, not less than 20 μm: 2 weight %). Subsequently, to 100 parts of the above toner, 0.1 part of a hydrophobic silica (R-972, a product of Nippon Aerosil Co., Ltd.) was added and mixed, feeding from the exterior to obtain a toner. The evaluation results of the obtained toner are shown in Table 4.

Examples 9 to 14

Toners were obtained in the same manner as in Example 8, except that resins 2 to 7 obtained in Examples 2 to 7 were used. The evaluation results of the obtained toners are shown in Table 4.

Comparative Examples 4 to 6

Toners were obtained in the same manner as in Example 8, except that resins 8 to 10 obtained in Comparative Example 1 to 3 were used. The evaluation results of the obtained toners are shown in Table 4.

Reference Examples 1 and 2

Resins 11 and 12 with the compositions similar to each other but difference in the existence of a carboxyl group were obtained in the same manner as in Example 1 using the components illustrated in Tables 1 and 2. Physical properties of these resins are shown in Table 3.

TABLE 1

| (A) Sample No. | Compositions (weight part) | | | Peak molecular weight (Mp) |
|---|---|---|---|---|
| | Styrene | Butyl acrylate | Hydroxy methacrylate | |
| A1 | 73 | 24.5 | 2.5 | 200,000 |
| A2 | 73 | 22 | 5 | 30,000 |
| A3 | 75 | 22.5 | 2.5 | 100,000 |
| A4 | 74 | 16 | 10 | 15,000 |
| A5 | 70 | 25 | 5 | 200,000 |

TABLE 2

| (B) Sample No. | Compositions (weight part) | | | Peak molecular weight (Mp) | Glass transition temperature Tg (° C.) |
|---|---|---|---|---|---|
| | Styrene | Butyl acrylate | Methacrylic acid | | |
| B1 | 92.5 | 6.5 | 1 | 5,000 | 58 |
| B2 | 84 | 15 | 1 | 8,000 | 56 |
| B3 | 79.5 | 19.5 | 1 | 12,000 | 56 |
| B4 | 77.5 | 21.5 | 1 | 21,000 | 56 |
| B5 | 93.5 | 6.5 | 0 | 5,000 | 56 |
| B6 | 81 | 19 | 0 | 14,000 | 56 |
| B7 | 80.5 | 18.5 | 1 | 14,000 | 56 |

TABLE 3

| | Example 1 | Example 2 | Example 3 | Example 4 | Example 5 | Example 6 | Example 7 | Comp. Example 1 | Comp. Example 2 | Comp. Example 3 | Ref. Example 1 | Ref. Example 2 |
|---|---|---|---|---|---|---|---|---|---|---|---|---|
| Resin | Resin 1 | Resin 2 | Resin 3 | Resin 4 | Resin 5 | Resin 6 | Resin 7 | Resin 8 | Resin 9 | Resin 10 | Resin 11 | Resin 12 |
| Sample No. | A1/B1 | A1/B2 | A2/B1 | A2/B2 | A2/B3 | A3/B1 | A5/B1 | A2/B4 | A4/B2 | A1/B5 | A4/B6 | A4/B7 |
| (A)/(B) mass ratio | 30/70 | 30/70 | 30/70 | 30/70 | 30/70 | 30/70 | 30/70 | 30/70 | 30/70 | 30/70 | 50/50 | 50/50 |
| (C) | TDI | TDI | TDI | TDI | TDI | TDI | MDI | TDI | TDI | TDI | TDI | TDI |
| (C)/((A) + (B)) mass ratio | 0.1 | 0.1 | 0.3 | 0.3 | 0.4 | 0.1 | 0.15 | 0.3 | 1 | 0.1 | 3.3 | 3.3 |
| OH mole (per 100 g of (A)) | 0.019 | 0.019 | 0.051 | 0.038 | 0.038 | 0.019 | 0.038 | 0.038 | 0.077 | 0.019 | 0.077 | 0.077 |
| OH mole (per 100 g of resin) | 0.0058 | 0.0058 | 0.012 | 0.012 | 0.012 | 0.0058 | 0.011 | 0.012 | 0.023 | 0.0058 | 0.039 | 0.039 |
| NCO mole (per 100 g of resin) | 0.0011 | 0.0011 | 0.0034 | 0.0034 | 0.0050 | 0.0011 | 0.0012 | 0.0034 | 0.011 | 0.0011 | 0.038 | 0.038 |
| OH/NCO | 5.0 | 5.0 | 3.3 | 3.3 | 2.5 | 5.0 | 9.6 | 3.3 | 2.0 | 5.0 | 1.0 | 1.0 |
| Cross-linking rate | 1 min. | 1 min. | 4 min. | 4 min. | 4 min. | 3 min. | 1 min. | 4 min. | 5 min. | 10 min. | 75 min. | 2 min. |
| Productivity | ◎ | ◎ | ○ | ○ | ○ | ○ | ◎ | ○ | Δ | X | X | ○ |

TABLE 4

| | | Example 8 | Example 9 | Example 10 | Example 11 | Example 12 | Example 13 | Example 14 | Comp. Example 4 | Comp. Example 5 | Comp. Example 6 |
|---|---|---|---|---|---|---|---|---|---|---|---|
| Resin | | Resin 1 | Resin 2 | Resin 3 | Resin 4 | Resin 5 | Resin 6 | Resin 7 | Resin 8 | Resin 9 | Resin 10 |
| Resin physical properties | Tg (° C.) | 57.2 | 57.1 | 58.1 | 58.4 | 57.1 | 57.3 | 56.6 | 58.3 | 60.5 | 55.4 |
| | Tm (° C.) | 126 | 125 | 122 | 125 | 125 | 124 | 125.6 | 127 | 122 | 119 |
| | Gel fraction (weight %) | 2 | 1.2 | 2 | 1 | 0.1 | 2 | 2.9 | 0.7 | 1.3 | 1 |
| Toner performance | 60% fixing temperature (° C.) | 133 ○ | 148 Δ | 133 ○ | 150 Δ | 135 ○ | 124 ○ | 135 ○ | 157 X | 110 ○ | 128 ○ |

TABLE 4-continued

| | Example 8 | | Example 9 | | Example 10 | | Example 11 | | Example 12 | | Example 13 | | Example 14 | | Comp. Example 4 | | Comp. Example 5 | | Comp. Example 6 | |
|---|---|---|---|---|---|---|---|---|---|---|---|---|---|---|---|---|---|---|---|---|
| Cold offset temperature (°C) | 135 | o | 130 | o | 135 | o | 135 | o | 130 | o | 140 | Δ | 130 | o | 130 | o | Offset appeared at all temp. | X | 135 | o |
| Hot offset Temperature (°C) | 220 | o | N/A | o | N/A | o | N/A | o | N/A | o | N/A | o | N/A | o | 200 | Δ | | | 170 | Δ |
| Hot offset rate (mm/s) | 30 | | N/A | | N/A | | N/A | | N/A | | N/A | | N/A | | 190 | | | | 190 | |

As is clear from Tables 3 and 4, for the resin 11 without containing a carboxyl group in the low molecular weight styrene copolymer of Reference Example 1, the reaction time was long and the productivity was inferior. Furthermore, for the resin 8 obtained in Comparative Example 1, the peak molecular weight of the low molecular weight polymer was high, while for the toner of Comparative Example 4 obtained by using the resin 8, the fixing properties were inferior. Further, for the resin 9 obtained in Comparative Example 2, the peak molecular weight of the high molecular weight polymer was low, while for the toner of Comparative Example 5 using the resin 9, the offset appeared. Also, in the comparison between Reference Examples 1 and 2, it was found that there was a big difference in the crosslinking rate depending on the existence of a carboxyl group.

On the other hand, the resin composition for toners and the toner of the present invention are excellent in a balance among the fixing properties, offset resistance and productivity.

Therefore, according to the resin composition for toners and the toner of the present invention, it is possible to provide a resin composition for toners and a toner having excellent low temperature fixing properties, offset resistance and productivity.

The invention claimed is:

1. A resin composition for toners comprising a resin (D) obtained by reacting a styrene polymer (A) containing an active hydrogen group and having a peak molecular weight (Mp) of not less than 30,000 but not more than 2,000,000, a styrene polymer (B) containing a carboxyl group and having a peak molecular weight (Mp) of not less than 2,000 but not more than 20,000, and a crosslinkable compound (C) having an isocyanate group.

2. The resin composition for toners as set forth in claim 1, wherein the ratio of the active hydrogen groups in said (A) and the isocyanate groups in said (C) is from 2:1 to 10:1.

3. The resin composition for toners as set forth in claim 1, wherein the active hydrogen group in said (A) is a hydroxyl group.

4. The resin composition for toners as set forth in claim 1, wherein the ½ flow temperature (Tm) measured with a flow tester is not less than 115° C. but not more than 135° C.

5. The resin composition for toners as set forth in claim 1, wherein the number of active hydrogen groups in said (A) is not less than 0.01 mole but not more than 0.2 mole per 100 g of said (A).

6. The resin composition for toners as set forth in claim 1, wherein the glass transition temperature (Tg) of said (B) is not less than 40° C. but not more than 75° C.

7. The resin composition for toners as set forth in claim 1, wherein the gel fraction is not less than 0.1 weight % but not more than 3.0 weight %.

8. The resin composition for toners as set forth in claim 1, wherein said resin (D) is obtained by adding said (C) to a liquid containing a mixture of said (A) and said (B) for the reaction.

9. The resin composition for toners as set forth in claim 1, further comprising at least one of natural wax or polyolefin wax having a melting point of not less than 60° C. but not more than 145° C. and comprising said wax in an amount of not less than 0.1 weight % but not more than 10 weight % based on said resin (D).

10. The resin composition for toners as set forth in claim 2, further comprising at least one of natural wax or polyolefin wax having a melting point of not less than 60° C. but not more than 145° C. and comprising said wax in an amount of not less than 0.1 weight % but not more than 10 weight % based on said resin (D).

11. A toner comprising the resin composition for toners as set forth in claim 1 and at least a colorant.

* * * * *